(12) United States Patent
McGuire

(10) Patent No.: US 6,564,815 B2
(45) Date of Patent: May 20, 2003

(54) AIR GAP MAGNETIC MOBILE ROBOT

(75) Inventor: Dennis McGuire, Stuart, FL (US)

(73) Assignee: UltraStrip Systems, Inc., Stuart, FL (US)

( * ) Notice: Subject to any disclaimer, the term of this patent is extended or adjusted under 35 U.S.C. 154(b) by 132 days.

(21) Appl. No.: 09/809,800

(22) Filed: Mar. 16, 2001

(65) Prior Publication Data

US 2002/0129841 A1 Sep. 19, 2002

(51) Int. Cl.$^7$ ................................................. B08B 3/02
(52) U.S. Cl. ..................... 134/104.4; 134/172; 134/181; 134/198; 15/1.7; 144/222
(58) Field of Search ........................... 15/1.7; 144/222; 134/172, 181, 198, 200, 201, 104.4

(56) References Cited

U.S. PATENT DOCUMENTS

| | | | |
|---|---|---|---|
| 2,098,262 A | * | 11/1937 | Temple |
| 2,104,062 A | * | 1/1938 | Temple |
| 2,132,661 A | * | 10/1938 | Temple |
| 2,596,322 A | * | 5/1952 | Zumwalt |
| 3,088,429 A | * | 5/1963 | Johanessen |
| 3,609,612 A | | 9/1971 | Tibbling |
| 3,922,991 A | * | 12/1975 | Woods |
| 3,960,229 A | * | 6/1976 | Shio |
| 3,984,944 A | * | 10/1976 | Maasberg et al. |
| 4,690,092 A | * | 9/1987 | Rabuse |
| 5,285,601 A | * | 2/1994 | Watkin et al. |
| 5,628,271 A | | 5/1997 | McGuire |
| 5,849,099 A | | 12/1998 | McGuire |
| 6,000,484 A | | 12/1999 | Zoretich et al. |
| 6,053,267 A | * | 4/2000 | Fisher |
| 6,102,145 A | * | 8/2000 | Fisher |

FOREIGN PATENT DOCUMENTS

| | | |
|---|---|---|
| FR | 2.145.115 | 2/1973 |
| GB | 1500198 | * 2/1978 |
| SU | 1054204 | * 11/1983 |

OTHER PUBLICATIONS

Patent Abstracts of Japan, vol. 1996, No. 9, Sep. 30, 1996 & JP 08–132291, (NKK Corp) May 28, 1992.
Patent Abstracts of Japan, vol. 016, No. 145 (M–1233), Apr. 10, 1992 & JP 4–2592, (Tokyu Car Corp), Jan. 7, 1992.
Patent Abstracts of Japan, vol. 1996, No. 4, Apr. 30, 1996 & JP 7–323701, (Hitachi Metals Ltd), Dec. 12, 1995.

* cited by examiner

Primary Examiner—Frankie L. Stinson
(74) Attorney, Agent, or Firm—McHale & Slavin, P.A.

(57) ABSTRACT

A mobile robot for cleaning, stripping, reconditioning or refurbishing a coating on a metal work piece has a remote controlled power module for locomotion and a working head for removing the coating. The robot is held on the metal work piece by magnets mounted on the robot but spaced from the work piece.

19 Claims, 3 Drawing Sheets

AIR GAP MAGNETIC MOBILE ROBOT

FIELD OF THE INVENTION

This invention is directed to a mobile robot that, by magnetic force, maintains operational contact with metal surfaces of the work piece over which it moves. The robot carries magnets displaced from the work piece an optimal distance related to the maximum magnetic flux between the robot and the work piece.

The robot carries attachments to strip, clean, refurbish and/or recondition the surface as it moves across the work piece. These attachments have structure and subsequent treatments that render the entire operation environmentally safe.

The robot can be used to refurbish any stationary or movable structures made of a metal having magnetic properties, such as buildings and vehicles. These structures include but are not limited to any iron or steel clad buildings, bridges, tunnels, pipe lines, ships, trains, cars, trucks, and military vehicles of all types.

BACKGROUND OF THE INVENTION

Mobile robots that have magnetic wheels in contact with the surface upon which they work are conventional. However, the movement of some of the robots across the metal surface caused ancillary damage to the surface in the area of contact. Because of the rigidity of the magnetic wheels and the magnetic force between the wheels and the rigid work surface, the paint or protective coatings on the work piece are crushed.

The prior art robots were not capable of treating the entire surface of the structures upon which they were attached because the working head or heads are located inboard of the wheels.

This invention is directed toward elimination of these characteristics of the prior art devices. Specifically, the magnets of this invention are not in contact with the work piece. Also, the working heads are located to allow the heads to extend to or beyond the margins of the work piece.

DESCRIPTION OF THE PRIOR ART

U.S. Pat. No. 5,628,271 and U.S. Pat. No. 5,849,099 both disclose a mobile robot for striping the hulls of ships. The robots have a chassis mounted on four wheels made of magnets. The chassis carries a rotary head enclosed in a chamber which applies water to the hull at approximately 30,000 pounds per square inch. The chamber is subjected to a negative pressure to remove the water and residue.

The magnetic force exerted directly upon the surface of the hull is sufficient to support the weight of the robot and overcome the force of the high pressure water impinging on the hull. The pressure created by the magnetic force is transmitted to the hull through the area of contact with the wheels. Since the wheels are made of a rigid magnetic metal, the area is confined to the tangential contact of the hull and the wheel. At any given moment, the entire magnetic force holding the hull and the robot together is transmitted by the foot print of the wheels which is, basically, four lines with a length representing the width of each wheel and a width representing the tangential contact between the circumference of the metal wheel and the plane of the metal hull.

The magnetic attraction between the wheels and the hull is of such magnitude directed through such minimal contact that the metal wheels crush and permanently damage the paint or protective coating between the wheels and the hull.

With the magnetic wheels placed at the four corners of the chassis, the high pressure rotary head could not be maneuvered to engage the entire surface of the hull, particularly the margins.

SUMMARY OF THE INVENTION

Accordingly, it is an objective of the instant invention to provide a magnetic mobile robot for traversing the surface of a work piece without damaging the protective coatings on the surface of the work piece as a result of contact between the robot and the surface.

It is a further objective of the instant invention to provide a magnetically supported mobile robot with working heads which clean, strip, recondition and/or refurbish the surface of a work piece It is yet another objective of the instant invention to provide an environmentally safe protective structure about the working heads that prevents escape of debris from the robot. The protective structure additionally guides the waste products into return lines for further processing.

It is another objective of the invention to treat the waste products by separation from the cleaning fluid and recycling the cleaning fluid through the working heads. The separated waste products are reduced by an environmentally safe process to a harmless by-product.

It is a still further objective of the invention to teach an environmentally safe process of stripping accretions, deposits, plant and animal forms, and protective coatings from magnetically active metal surfaces and disposing of the waste products.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DESCRIPTION OF THE INVENTION

Figure 1:
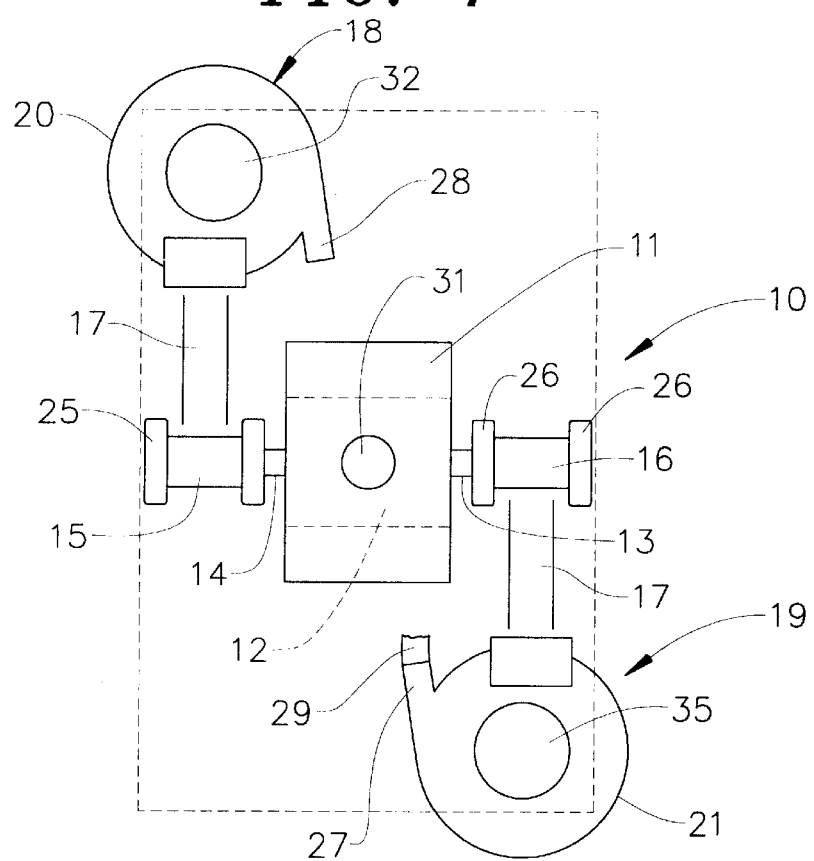
FIG. 1 is a schematic of a top plan view of an embodiment of the robot of this invention.

The mobile magnetic robot 10, shown in FIG. 1, has a power module made up of a motor 11 and transaxle unit 12. The motor may be electric, hydraulic, pneumatic, or fuel burning. As shown, the transaxle is mounted under the motor. However, this relationship may be reversed or the motor and transaxle may be laterally disposed to each other. The transaxle 12 has axle stubs 13 and 14 extending on opposite sides of the unit. Wheels 15 and 16 are removably connected to the axle stubs 13 and 14. The transaxle has the ability to turn one wheel in one direction and the other wheel in the opposite direction, simultaneously, to spin the robot in its own length. The transaxle can also stop one wheel while the other is turning to change direction of the path of the robot. The power module may be controlled remotely by wire or wireless signaling from a computer or manual controller 7 to maneuver the robot to traverse the entire surface of the work piece. Alternatively or additionally, the power module may have an on-board computer to operate the power and working head components in response to commands received by wire or wireless.

The power module is attached to a chassis 17 which also supports stripping units 18 and 19. The stripping units 18 and 19 include shrouds 20 and 21 forming enclosures which prevent the escape of debris from the robot. The lower circumference of each shroud maintains sealing contact with the surface of the work piece. The lower circumference of the shrouds have skirts 22 and 23 made of a rubber, silicone or polymer material.

Shroud 21 is spaced from wheel 15 and shroud 20 is spaced from wheel 16. Using the axis of rotation of the wheels as a center line, as shown in FIG. 1, the shroud 20 is located on the left of the center line and shroud 21 is located on the right of the center line. Each shroud is aligned with its associated wheel. This disposition results in the working heads being laterally displaced from each other to cover a larger area of the work piece. Depending on the direction of movement of the robot, a stripping unit precedes it's associated wheel allowing the stripping unit to extend to or beyond the margin of the work piece.

Figure 2:
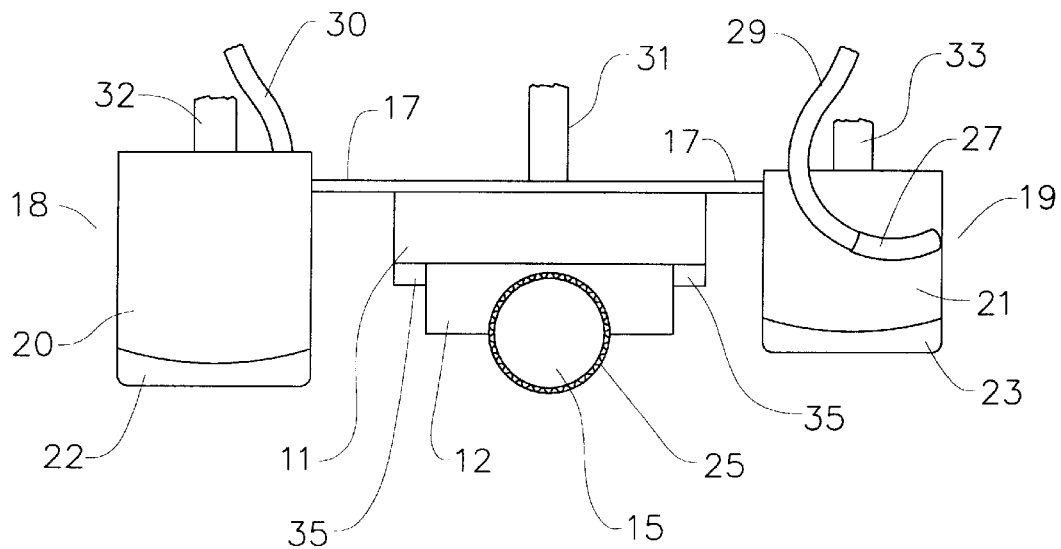
FIG. 2 is a schematic side view of another embodiment of this invention.

In FIG. 2, the exhaust guide 27 of shroud 21 is shown with the attached exhaust line 29 which removes the debris by a centrifuge action which directs the momentum of the cleaning fluid out of the shroud. The shroud may have a vacuum line for removing any residual particles and moisture.

The power module has a umbilical fitting 31 through which power and control lines connect the motor 11 and transaxle 12 of the robot with the remote control station. The umbilical fitting is a universal mount (not shown) which allows the robot to move in any direction without placing additional rotational stress on the lines. The umbilical 31 may include electrical or electronic elements which correspond to the remote controller to facilitate the controller commands.

Shroud 20 has an umbilical fitting 32 for attaching the pressure and vacuum lines feeding working head 18. Shroud 21 has a similar umbilical fitting 33. These fittings are connected to a universal mount (not shown) which permits lateral movement and turning without putting rotational stress on the lines. The umbilical 32 includes the high pressure fluid line, a vacuum line and the exhaust line.

All the lines carried by the umbilicals 31, 32, and 33 may be routed into a common harness which has a universal connection with all the necessary lines from the remote station to allow the free movement of the robot.

Figure 3:
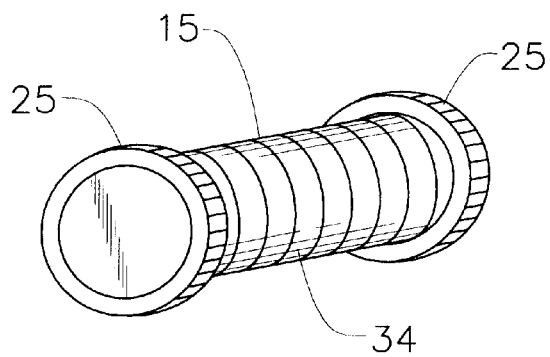
FIG. 3 is a perspective of the a wheel of this invention.
Figure 4:
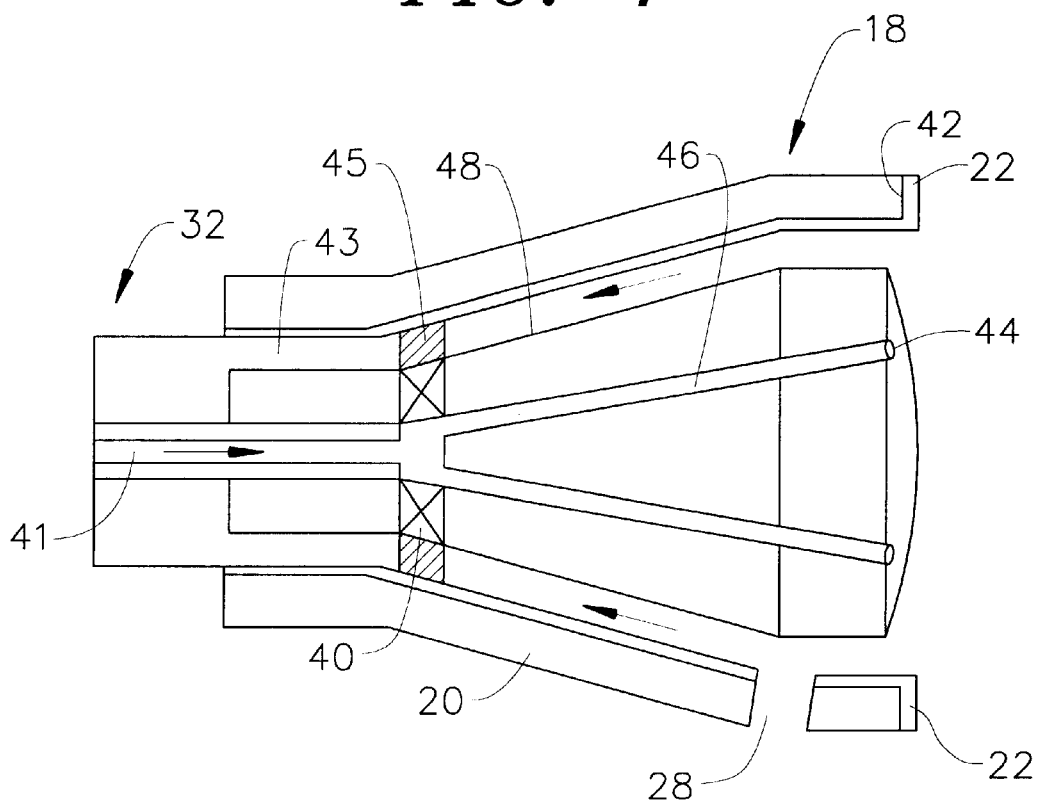
FIG. 4 is a side view of a working head of this invention.

The wheel 15, shown in FIGS. 3 and 4, is formed of magnets 34. As shown, the wheels are made of permanent magnets but electromagnets may be used. The magnetic force generated by the wheels is sufficient to support the weight of the robot and overcome the pressure generated by the high pressure cleaning fluid impinging on the work piece. As shown, the wheels are made of several magnets arranged in sequence to present a continuous magnetic attraction between the wheels and the work piece as the wheels rotate. Each wheel has a tire made of rubber of other polymer, such as polyurethane, polystyrene and nylon, that will withstand the compression forces of the magnets. The tire material may be continuous or cellular. The tire 25 may extend over the entire wheel or it may be separated into spaced apart rings, as shown in the drawings. The tire may be molded on the magnetic wheel or held in place by friction or adhesives. Also, the wheels may have structure, such as a groove, to retain the tires in a specific relationship to the wheels.

The tire is capable of withstanding the magnetic force exerted between the wheels and the work piece while maintaining a constant space between the wheels and the work piece. Any deformation of the tire results in a larger foot print in contact with the work piece. However, the thickness of the tire and the resultant space between the wheel and the work piece is optimized to correspond to the distance within which the greatest magnetic attraction is present. For example, a tire thickness of at least $\frac{1}{32}$ inch results in satisfactory magnetic attraction. The tires 25 and 26 may have larger thicknesses up to the point that magnetic attraction between the wheels and the work piece is lost. The specific tire thickness will vary with the strength of the magnetic force generated by the magnets. The tires may be solid or pneumatic or filled with other fluids.

The tires 25 and 26 also cushion the contact between the magnetic wheels and the work surface. Any deformation of the tire increases the area in contact with the work piece and decreases the pounds per square inch of pressure exerted on the work surface. When the robot traverses the work surface, the tires do not damage any protective coating or paint. This becomes more important when the surface coating of the work piece is not completely removed but merely refurbished. If the surface coating is crushed by the wheels, the refurbished coating will have underlying areas of permanent damage which reduce the life expectancy of the coating.

As an alternate embodiment, the robot 10 may have bar magnets 35, as shown in FIG. 2., mounted on the power module. The bar magnets are shaped and disposed to gain the strongest magnetic attraction between the bar and the work piece. The bar magnets may extend laterally the width of the wheels. In this embodiment, the wheels may or may not be formed of magnets depending on the magnetic force produced by the bar magnets and the required force necessary to support the robot. The magnets may be oriented on the bar in a manner to provide the greatest amount of magnetic force.

Figure 5:
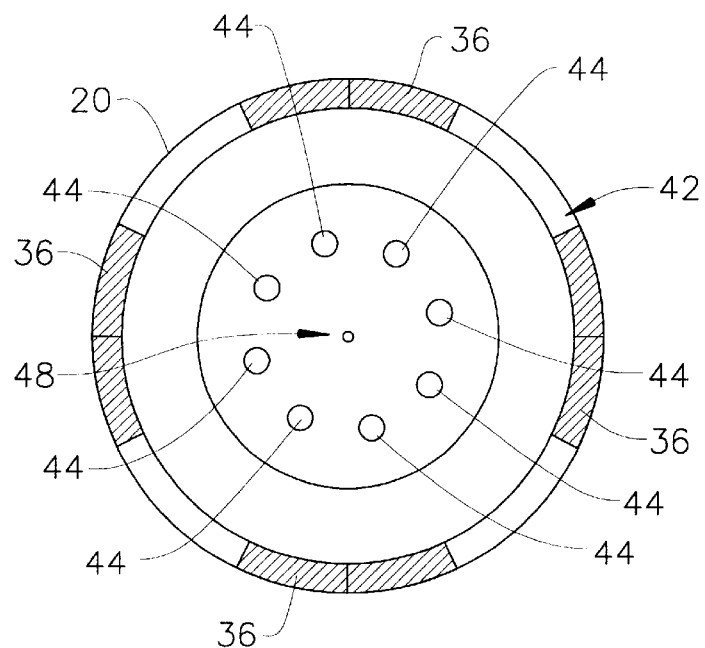
FIG. 5 is a bottom view of another working head of this invention.

The magnets may be incorporated into the robot in another alternative construction, shown in FIG. 5. The magnets 36 are connected to the bottom circumference of the shrouds. The flexible skirts extend below the magnets and form the seal between the robot and the work piece. In FIG. 5, the bottom circumference 42 of shroud 20 is shown with the skirt 22 removed. In this embodiment, the wheels may or may not be magnetic. Also, the bar magnets 35 may or may not be used in combination with the circumferential magnets 36.

In FIG. 4, the stripping unit 18 has a shroud 20 surrounding the working head 48. The lower circumference of the shroud has the fluid seal 22. The umbilical fitting 32 extends from the upper surface of the shroud. Supply and exhaust lines are connected to the fitting.

The working head 48 rotates inside the shroud 20 in response to high pressure fluid from supply line 41 traversing obliquely angled bores 46 which terminate in orifices 44. Bearings 40 and bracket 45 support the rapidly spinning head inside the stationary shroud. The high pressure fluid flows through the bores 46 and impinges upon the work surface. The rotary momentum of the fluid continues about the head confined by the shroud and skirt stripping the coating from the work surface. The fluid carries the debris from the surface into the exhaust guide 28 and out the exhaust line 30. A vacuum line 43 is connected to the space between the shroud and the head to remove any residual fluid and debris. The entire stripping process is accomplished without releasing any debris into the atmosphere.

The pressure and rotary motion of the high pressure fluid impinging on the work surface act to strip the surface away from the underlying structure leaving a bare metal surface, if desired. In some instances, it may not be desirable to completely remove the protective coating on the structure. By adjusting the pressure of the fluid, or the speed of movement of the robot, or the distance of the orifices from the work surface, or a combination of these variables, the coating may be removed to the bare metal or the depth can be controlled.

The robot may also be equipped with attachments (not shown) to apply a new protective coating to the work piece as an after treatment to the reconditioned surface. In this manner, the time a reconditioned surface is exposed to the weather is minimized or eliminated.

Figure 6:
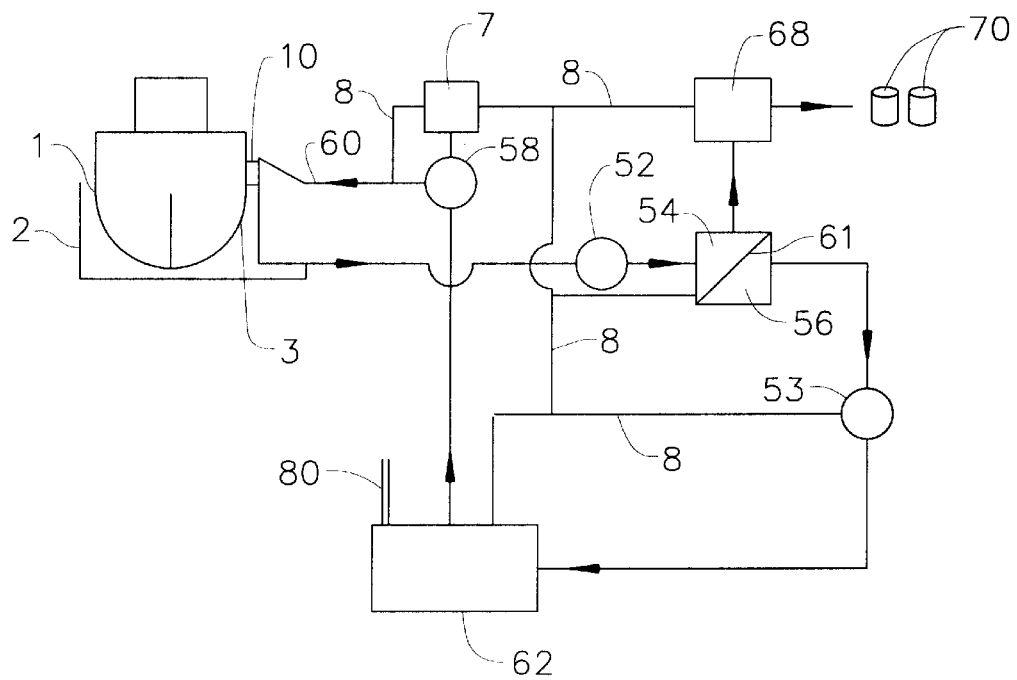
FIG. 6 is a block diagram of the entire system.

In FIG. 6, a ship 1 is shown in drydock 2. The hull of the ship has a coating 3 to be removed or reconditioned by robot 10 The robot 10 and the system is controlled by controller 7 through connections, shown generally as, line 8. High pressure fluid is supplied to the robot 10 through line 60 by pump 58. Line 60 and line 8 form part of the umbilical to the robot. After the fluid impinges the ship it flows to collecting tank 54, aided by pump 52. Collection tank 54 receives the slurry of fluid and debris from the ship. After a filtration step, across filter 61, the waste material is separated from the fluid. This hazardous waste material is routed to a further environmentally safe treatment facility 68 where it may be dried or incinerated or otherwise chemically altered to produce an innocuous by-product. The by-product may be removed by containers, such as barrels 70.

The filtered fluid in tank 56 is moved, by pump 53, to a holding tank 62 for recycling through the robot. Additional fluid may be added to the tank through inlet 80.

The high pressure fluid used in the process may be water or other suitable fluid. The water jet ultra high pressure at the orifices 44 is in the range of 35,000 pounds per square inch (psi) to 60,000 psi produced by positive displacement pump 58. The orifice size is sufficient to permit a fluid flow in the range of 1,500 feet per second (ft/sec) to 3,000 ft/sec. The wheels 15, 16 may be three pole neodymium-iron-boron with a magnetic force in the range of at least 2,000 pounds. The motor 11 may be a 24 volt DC electric motor producing approximately 4,000 rpm. The transaxle 12 has reduction gearing which produces sufficient torque to turn the magnetic wheels upon a ferro-metallic work piece.

It is to be understood that while a certain form of the invention is illustrated, it is not to be limited to the specific form or arrangement of parts herein described and shown It will be apparent to those skilled in the art that various changes may be made without departing from the scope of the invention and the invention is not to be considered limited to what is shown and described in the specification and drawings.

What is claimed is:

1. A mobile magnetic robot for altering a coating of a ferro-magnetic work piece comprising a chassis, said chassis connected to a power module and to at least one stripping unit, said power module and said at least one stripping unit connected to a remote controller, said stripping unit adapted to supply energy to the coating of said work piece, said power module operatively connected to at least one wheel for rotating said at least one wheel, at least one magnet attached to said robot for magnetically attracting said robot to said ferro-magnetic work piece with sufficient magnetic force to maintain said robot in operative relationship with said work piece, said magnet spaced from said ferro-magnetic work piece to prevent damage to the coating wherein said at least one wheel is made of at least one magnet, said at least one wheel being surrounded by a non-magnetic tire, said tire being of sufficient thickness to prevent contact between said wheel and said work piece.

2. A mobile magnetic robot of claim 1 wherein said at least one wheel is made of a plurality of permanent magnets, said permanent magnets having opposite poles, said poles of said magnets oriented to provide a continuous magnetic attraction between said robot and said work piece during rotation of said at least one wheel.

3. A mobile magnetic robot of claim 2 wherein said non-magnetic tire is in the form of spaced apart discrete bands.

4. A mobile magnetic robot for altering a coating of a ferro-magnetic work piece comprising a chassis, said chassis connected to a power module and to at least one stripping unit, said power module and said at least one stripping unit connected to a remote controller, said stripping unit supplying energy from about 20,000 to about 60,000 pounds per square inch to the coating of said work piece, said power module operatively connected to at least one wheel for rotating said at least one wheel, at least one magnet attached to said robot for magnetically attracting said robot to said ferro-magnetic work piece with sufficient magnetic force to maintain said robot in operative relationship with said work piece, said magnet spaced from said ferro-magnetic work piece to prevent damage to the coating wherein said at least one magnet is a bar magnet, said bar magnet operatively connected to said power module, said bar magnet disposed in a plane parallel with the surface of said ferro-magnetic work piece.

5. A mobile magnetic robot of claim 4 wherein said bar magnet is a permanent magnet having opposite poles, said poles disposed to provide the strongest magnetic attraction between said magnet and said work piece.

6. A mobile magnetic robot of claim 5 wherein the space between said bar magnet and said work piece is an air gap.

7. A mobile magnetic robot for altering a coating of a ferro-magnetic work piece comprising a chassis, said chassis connected to a power module and to at least one stripping unit, said power module and said at least one stripping unit connected to a remote controller, said stripping unit adapted to supply energy to the coating of said work piece, said power module operatively connected to at least one wheel for rotating said at least one wheel, at least one magnet attached to said robot for magnetically attracting said robot to said ferro-magnetic work piece with sufficient magnetic force to maintain said robot in operative relationship with said work piece, said magnet spaced from said ferro-magnetic work piece to prevent damage to the coating wherein said at least one stripping unit includes a shroud, said shroud having a peripheral seal adapted to contact said work piece, said seal for preventing escape of debris from said at least one working head, said at least one magnet attached to said shroud between said shroud and said peripheral seal.

8. A mobile magnetic robot for removing a portion of a coating from a ferro-magnetic work piece comprising at least two wheels supporting a chassis, a power module connected to said chassis, said power module connected to a remote controller providing command and control of said robot, at least one stripping unit attached to said chassis for directing ultra high pressure fluid onto said work piece, one of said at least two wheels attached on one side of said power module, the other of said at least two wheels attached on the opposite side of said power module, said at least two wheels disposed for powered parallel rotation, permanent magnets mounted on said robot for magnetically attracting and holding said robot to said work piece, said at least two wheels having non-magnetic tires mounted thereon for spacing said at least two wheels from said work piece to prevent damage to said work piece by said at least two wheels wherein said permanent magnets are formed as said at least two wheels, said at least two wheels having non-magnetic tires fixed thereabout, said non-magnetic tires providing spacing between said at least two wheels and said work piece to prevent damage to said work piece by said at least two wheels, each of said at least two wheels have a stripping unit juxtaposed thereto, said stripping units have shrouds enclosing rotating working heads, exhaust guides in said shrouds for directing said fluid away from said working head.

9. A mobile magnetic robot of claim 8 wherein said permanent magnets are formed as an elongated bar, said bar spaced from said work piece.

10. A mobile magnetic robot of claim 8 wherein said at least one stripping unit includes a shroud to contain debris from said work piece, said shroud having a peripheral seal contacting said work piece, said permanent magnets are mounted in said shrouds, said peripheral seal spacing said magnets from said work piece.

11. A mobile magnetic robot of any of claims 8 or 9 or 10 wherein said magnets are electro-magnets.

12. An environmentally safe system for cleaning a protective coating on a ferro-magnetic work piece and reducing the protective coating by-products comprising a robot having a chassis, magnets attached to said robot magnetically attracting said robot to said work piece, said magnets spaced from said work piece, a power module providing direction and movement connected to said chassis, at least one stripping unit for cleaning said work piece attached to said chassis, said stripping unit having a shroud enclosing a rotatable working head, said working head connected to a pump for supplying ultra high pressure fluid, said pump connected to a source of fluid, said working head carrying orifices for delivery of ultra high pressure fluid onto said work piece and rotating said working head, said shroud having a peripheral seal about said working head, said peripheral seal for contacting said work piece and confining said fluid, said shroud having an exhaust guide for removing said fluid and said by-products by centrifuge action, said exhaust guide connected to a container, said container including a separator for removing said by-products from said fluid, a converter connected to said container, said converter reducing said by-products in an enclosed atmosphere, said container connected to said source of fluid, said robot, said pump, said container, said separator, said converter and said source of fluid operatively connected to a controller for monitoring and commanding said system.

13. The system of claim 12 wherein said controller is manual.

14. The system of claim 12 wherein said controller is computer driven.

15. The system of claim 12 wherein a plurality of stripping units are attached to said chassis.

16. A system of claim 12 wherein said direction and movement of said robot is directed by said controller.

17. A system of claim 12 wherein said power module includes powered wheels, said wheels formed as said magnets, said wheels having non-magnetic tires mounted thereon to space said magnets from said work piece.

18. A system of claim 12 wherein said magnets are in the form of a bar magnet, said bar magnet connected to said power module spaced above said work piece.

19. A system of claim 12 wherein said magnets are fixed in said shroud above said peripheral seal.

* * * * *